United States Patent [19]

Murata et al.

[11] 4,227,119

[45] Oct. 7, 1980

[54] CONTROLLED LIGHTING DEVICE

[75] Inventors: Tomoji Murata, Toyokawa; Kenji Shibazaki, Aichi; Hideo Ito, Toyokawa, all of Japan

[73] Assignee: Minolta Camera Kabushiki Kaisha, Osaka, Japan

[21] Appl. No.: 970,957

[22] Filed: Dec. 19, 1978

Related U.S. Application Data

[63] Continuation of Ser. No. 740,218, Nov. 9, 1976, abandoned.

[51] Int. Cl.[3] .................... H05B 37/02; G03B 27/72

[52] U.S. Cl. .................................. 315/151; 250/205; 315/153; 355/68; 315/156

[58] Field of Search .............. 315/151, 152, 153, 156, 315/158, 307; 250/205; 355/68, 69

[56] References Cited

U.S. PATENT DOCUMENTS

| | | | |
|---|---|---|---|
| 3,483,428 | 12/1969 | LaPlante | 315/151 |
| 3,742,295 | 6/1973 | Irie | 355/69 X |
| 3,952,242 | 4/1976 | Okai | 315/158 X |
| 4,024,428 | 5/1977 | Bachur et al. | 315/151 |

*Primary Examiner*—Eugene R. La Roche
*Attorney, Agent, or Firm*—Watson, Cole, Grindle & Watson

[57] ABSTRACT

A lighting device in which an amount of light emitted by a lamp is detected by a light receiving element for controlling the input voltage of the lamp commensurate with the detected amount of light. By utilizing a pre-illumination system in conjunction with the lighting device, it is possible to improve the sensitivity characteristics of the light receiving element as the lamp is being charged up to a desired level of illuminescence and to prevent the input of an excessive voltage to the lamp.

4 Claims, 11 Drawing Figures

FIG. 2(a)
FIG. 2(b)
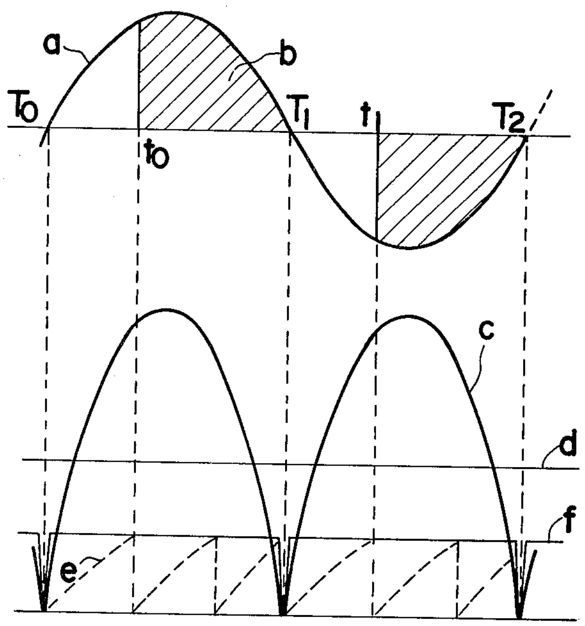
FIG.3(a) Prior art
FIG.3(b) Prior art
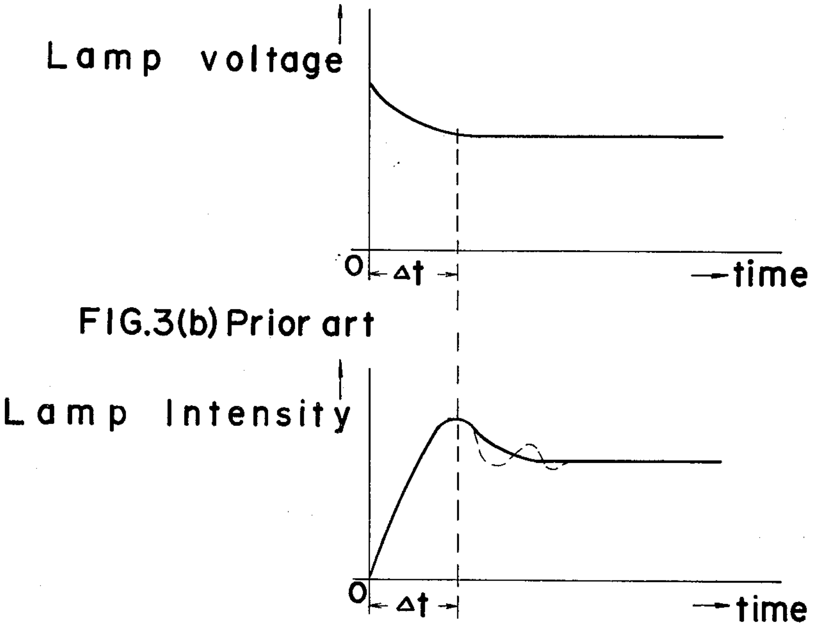

CONTROLLED LIGHTING DEVICE

This is a continuation of application Ser. No. 740,218 filed Nov. 9, 1976, now abandoned.

BACKGROUND OF THE INVENTION

The present invention relates to a lighting device in which an amount of light from an illumination lamp is detected by a light receiving element and then an input voltage for the illumination lamp is controlled commensurate with a variation in output of the light receiving element.

In order to prevent a variation in amount of light from an illumination lamp due to a variation in the voltage of a potential source, it has been a common practice to use a lighting device which is controlled such that an amount of light emitted by an illumination lamp is detected by a light receiving element and an input voltage for the illumination lamp is controlled in correspondence with the variation in amount of light detected. The control is provided since the variation in the light leads to a variation in the electrical resistance of the light receiving element which in turn is used to vary the input voltage.

A lighting device of the above-noted type as utilized in the prior art is shown in FIG. 1. A light receiving element 1, such as a CdS cell, is arranged to receive light from an illumination lamp L. The light receiving element is connected to a constant voltage source via terminal B, a rectified voltage source via terminal A, resistors R1 to R10, transistors Tr1 to Tr3, programmable unijunction transistor PUT and condenser C1. With this circuitry, the phase control is effected commensurate with an amount of light emitted by illumination lamp L by using an input of the PUT as a trigger pulse for a bi-directional thyrister TRIAC, which controls the phase of an input A.C. potential source D–E for illumination lamp L.

The above phase control is carried out by the following circuit arrangement. A wave form of a voltage from an A.C. potential source which has been full-wave rectified is fed as an input to terminal A (see FIG. 2). The voltage at terminal A in turn is connected by way of resistor R1 to the base of transistor Tr1. The collector of transistor Tr1 is connected by way of resistor R2 to terminal B of the constant voltage potential source and to the base of transistor Tr2 by way of resistor R3, so as to form a switching circuit with transistors Tr1 and Tr2. Light receiving element 1 also forms a bridge circuit with the aid of resistors R4, R5, R6, R9 and R10. The base of transistor Tr3 is connected to a junction between light receiving element 1 and resistor R9. The other terminal of element 1 is coupled to light responsive variable resistor R5 through resistor R4 and then to resistor R8 and finally to the emitter of transistor Tr3. The collector of transistor Tr3 is connected to condensor C1 and to the anode of programmable unijunction transistor PUT. In addition, the collector of transistor Tr2 together with the gate of transistor PUT is connected to the junction between resistor R6 and resistor R7. The cathode of transistor PUT is connected to an input terminal of a primary winding of a pulse transformer TP. An output terminal of a secondary winding of pulse transformer TP is connected by way of diode D2 and resistor R13 to a gate of the TRIAC. Illumination lamp L is connected via the TRIAC to A.C. potential source terminals D–E. Meanwhile the emitters of the transistors Tr1, Tr2 are connected to ground.

The charge stored in condenser C1 is discharged through the cathode of programmable unijunction transistor PUT, when the anode voltage of the transistor increases beyond the sum of the gate voltage and the voltage drop across the gate and the anode. A resulting discharge current generates a pulse voltage on the gate of the TRIAC by way of pulse transformer TP, thereby causing the TRIAC to be conducting.

During operation of the above-described circuit arrangement, an A.C. wave form as shown at (a) in FIG. 2(*a*) is fed to terminals D–E, a rectified wave form shown at (c) in FIG. 2(*b*) is fed to terminal A, and a constant voltage shown at (d) is fed to terminal B. The rectified wave form (c) has a zero phase at zero-phase points (T0, T1, T2 . . . ) of the A.C. wave form (a). A description will be given below of the phase control for one cycle of an A.C. wave form (a).

When illumination lamp L is lit, a lighting switch SW1 is closed by suitable means. When voltages having wave forms (a), (c) are impressed on the terminals D–E and A, respectively, then the base voltage at transistor Tr1 increases simultaneously with the voltages (a) and (c), thereby causing transistor Tr1 to become conducting. Activation of transistor Tr1 nullifies the base voltage at transistor Tr2, thereby causing transistor Tr2 to be turned off, so that a divided-voltage wave form (f) of a constant-voltage wave form (d) is impressed on the gate of transistor PUT. On the other hand, a voltage generated across a voltage divider formed by the resistance of light receiving element 1 and resistors R8, R9 is impressed on the base of transistor Tr3, while a voltage generated across a voltage divider formed by resistor R4, variable resistor R5, resistors R6, R7 is impressed on the emitter of transistor Tr3, so that transistor Tr3 is brought into a conducting condition due to the difference in divided voltages. As a result, condenser C1 is charged by way of transistor Tr3. The wave form of the voltage across the opposite ends of condenser C1 is shown at (e). When the voltage across condenser C1 rises to a linear proportion of the gate voltage of transistor PUT, then the charge stored in the condenser is instantaneously discharged from the cathode of transistor PUT. The discharge of the condenser causes a current which generates a pulse voltage provided to pulse transformer TP. A pulse voltage is then impressed on the gate of the TRIAC thereby triggering the TRIAC (at point (t0 of FIG. 2). Once the TRIAC is triggered, an electric power is supplied to illumination lamp L (during a period shown by the hatched portion (b) in FIG. 2). Thereafter, the TRIAC maintains its conducting condition until an A.C. wave form (a) is brought to a zero phase again (point T1), due to the nature of the TRIAC. During that time, condenser C1 repeats a cycle of charge and discharge, although the charging rate depends on the resistance of light receiving element 1 and the set resistance of variable resistor R5. Consequently, the discharge cycle of condenser C1 is not always coincident with the zero phase of the A.C. voltage wave form (a). The rectified voltage wave form (c) however is also brought to a zero phase, at the time of the zero phase of A.C. voltage wave form (a), so that the base voltage at transistor Tr1 is nullified so as to turn the transistor off. Upon turning off transistor Tr1, a voltage at resistor R2 is instantaneously impressed on the base of transistor Tr2 so as to cause the transistor to start conducting. Meanwhile, the gate voltage at programmable unijunction transistor PUT instantaneously drops to zero, as shown at (f) in FIG. 2. As a result, irrespective of the voltage across condenser C1, the stored charge in the condenser is discharged and the wave form (e) of the voltage across the condenser is necessarily nullified at the zero phase point of the A.C. voltage wave form (a), as shown, thereby bringing the trigger pulse for a phase control into synchronism with the input voltage wave form (a). When the A.C. voltage wave form (a) is built up from a point T1 in the direction of an inverse voltage, the TRIAC is triggered at a point t1 in the manner as previously described. The TRIAC, therefore, maintains its conducting condition up to a point T2, thus repeating these operations for each cycle of A.C. potential source.

The phase control of illumination lamp L may be carried out by utilizing a variation of the electrical resistance of light receiving element 1, which variation is caused due to a variation in amount of light emitted by illumination lamp L. For instance, if the input voltage at the A.C. potential source terminals D–E is lowered for one reason or another, thus causing a corresponding decrease in the amount of light being emitted, then the resistance of light receiving element 1 will be increased. With this increase in resistance, the charging rate for condenser C1 will be increased, while the timing pulses to trigger the TRIAC will be more rapidly supplied. As a result, the electric power to be impressed on illumination lamp L will be increased, thereby compensating for any instantaneous drop in amount of light.

The desired level of light to be emitted by lamp L can be set by varying the resistance of variable resistor R5, which is arbitrarily preset by the user.

With a lighting device using the described light receiving element, when a potential source voltage is impressed on illumination lamp L, then the lamp will be lit in accordance with the described phase control. During the stage of lighting in which the lamp is building up to the desired level of illuminescence, i.e., during the time required for the lamp to reach such a level, very little light is incident on light receiving element 1.

Consequently, during this period, the electrical resistance of light receiving element 1 is extremely high and hence the rate of the timing pulses to trigger the TRIAC is highly accelerated, so that electrical power approximating equal to the full power of the source may be supplied to the illumination lamp.

Furthermore with this arrangement, the resistance which is provided may not be accurately commensurate with the variation in amount of light from lamp L, during the build up stage of lighting of the lamp. This failure occurs since light receiving element 1 requires a given duration of time for building up to its responsiveness to a variation in the amount of light, when the amount of light was initially of a zero level, or darkness.

In FIG. 3, the variation in voltage to be impressed on illumination lamp L is shown, with the voltage to be impressed being represented along the ordinate and the time being represented along the abscissa. As shown, during the build up stage ($\Delta$t) of lighting, an excessive voltage or overvoltage is supplied to the input of the lamp, so that the amount of light being emitted, or the brightness of the lamp, rapidly increases. As shown in FIG. 3(*b*), in which the amount of light is represented along the ordinate and the time is represented along the abscissa, the amount of light goes beyond a rated amount of light, i.e., causes an overshooting phenomenon, after which the amount of light enters a steady, controlled zone. The overshooting can also cause the amount of light to oscillate as shown by a broken line in FIG. 3(*b*) before leveling off to a steady state.

This overshooting phenomenon which occurs due to an overvoltage input shortens the service life of the illumination lamp and also can cause over-illumination during the build up stage of lighting. This is particularly troublesome in the case where the exposure lamp in an electrophotographic copying machine is the above-described type of controlled lighting device. Where the exposure lamp in a copying machine repeats a cycle of being turned on and off in association with a copying operation, the overvoltage input at the initiation of lighting will adversely affect the service life of the lamp.

SUMMARY OF THE INVENTION

An object of the present invention is to provide a lighting device of the previously-described type in which the input voltage supplied to the illumination lamp is more accurately controlled in such a manner as to avoid the disadvantages of the prior art devices.

Another object of the present invention is to provide a pre-illumination system adapted for use in a lighting device for enabling more accurate control of the illumination lamp of the device.

A further object of the present invention is to provide a lighting device having a pre-illumination system, which emits light to be incident on a light receiving element which is also adapted to receive light emitted by an illumination lamp whose amount of light is to be controlled, with such light being emitted by the pre-illumination system before the illumination lamp is normally lit, so that at the time of a normal lighting the amount of light incident on the light receiving element as well as sensitivity characteristics of the light receiving element are both brought into a stable condition.

Still another object of the present invention is to provide a pre-illumination system adapted for use in a light controlling device for use in maintaining at a constant level the amount of light emitted by an exposure lamp in an electrophotographic copying machine.

Still a further object of the present invention is to provide a pre-illumination system, in which there is provided a pre-illumination lamp in addition to the illumination lamp, so that the light from the pre-illumination lamp is incident on the light receiving element, before the illumination lamp is lit, thereby both preventing an overvoltage input upon activation of the illumination lamp and causing the light receiving element to exhibit stable sensitivity characteristics.

These objectives can be readily attained by using a control lighting device having a pre-illumination system in accordance with the present invention. The lighting device includes an illumination lamp and a pre-illumination system, both of which emit light that can be detected by a light receiving element. The electric power supplied to the illumination lamp is controlled in response to the light detected by the light receiving element, whose electric output varies in correspondence with the detected light. The pre-illumination system is arranged so as to direct light to the light receiving element, at least during the stage in which the illumination lamp is building up to the desired level of operation. As a result, the possibility of an overvoltage input during the build up stage of lighting of the illumination lamp is prevented. Furthermore the sensitivity characteristic of the light receiving element for controlling the electric power for the illumination lamp are stabilized.

BRIEF DESCRIPTION OF THE DRAWINGS

FIGS. 2(*a*) and 2(*b*) are diagrams showing voltage wave forms in various portions of the circuit of FIG. 1.

FIGS. 3(*a*) and 3(*b*) are diagrams showing the relationships between voltages and amounts of light during the build up stage of lighting of an illumination lamp in a prior art controlled lighting device.

FIG. 7(*b*) is a perspective view with a portion cut away showing the arrangement of the light receiving element and the pre-illumination lamp.

DESCRIPTION OF THE PREFERRED EMBODIMENT

Figure 1:
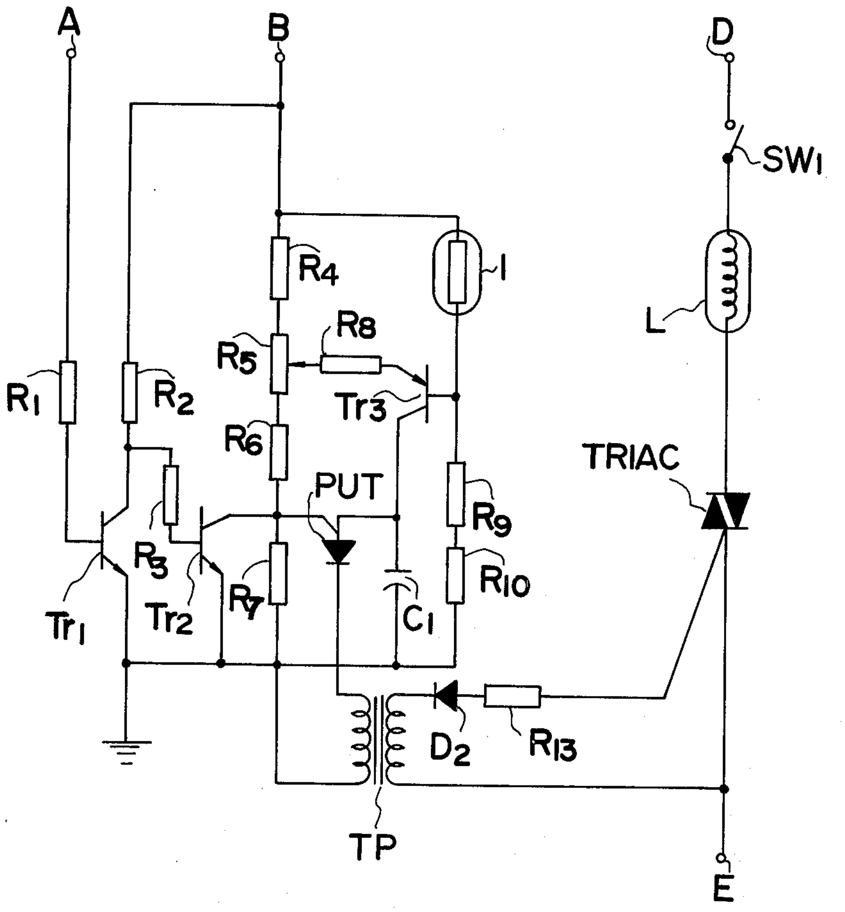
FIG.1 (Prior art)
FIG. 1 is a circuit diagram of a prior art controlled lighting device.
Figure 4:
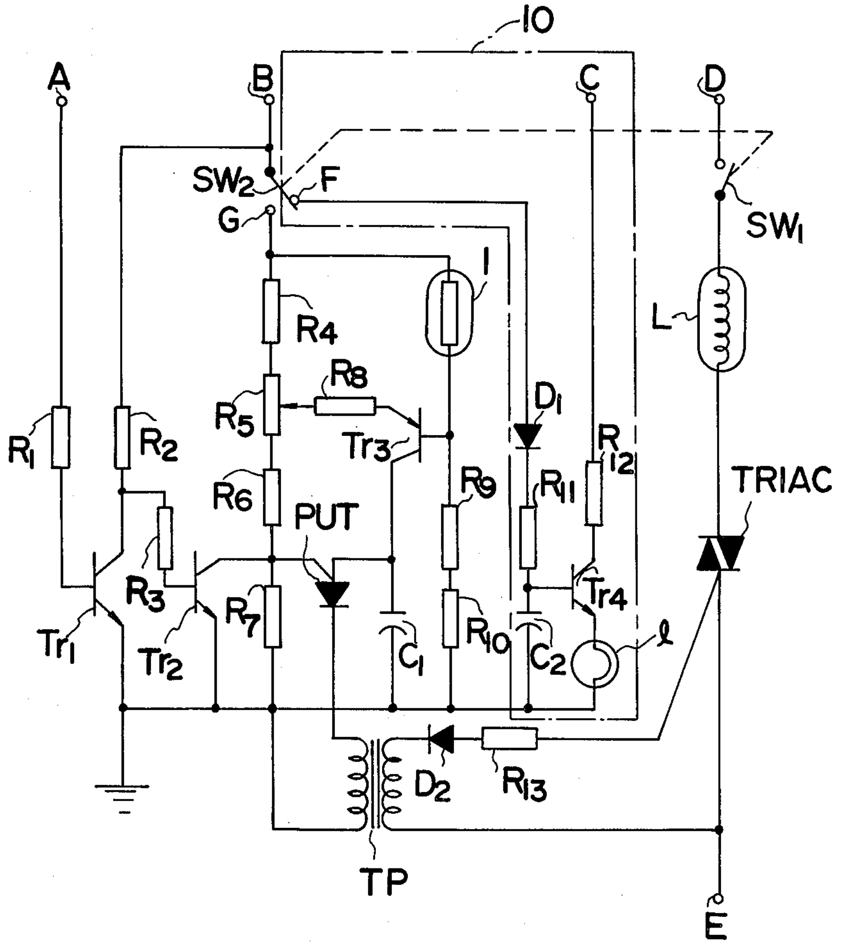
FIG. 4 is a circuit diagram of a controlled lighting device in accordance with the present invention.

In FIG. 4, there is illustrated one example of a circuit arrangement of a controlled lighting device having a pre-illumination system according to the present invention. Those parts similar to those in FIG. 1 are designated by the same reference numerals. The portion encompassed by phantom line 10 represents the portion added to the arrangement of FIG. 1.

Before describing the circuit arrangement, it should be noted that the term "build up stage of the lamp" refers to the stage or period of the time required for the lamp to reach the desired, or sufficient, level of illuminescence and that the term "build up stage of the light receiving element" refers to the stage of time required for the light receiving element to reach a sufficient level of sensitivity.

Terminal C, which is connected to a D.C. potential source, is coupled by way of a resistor R12 and a transistor Tr4 to a pre-illumination lamp l. The base of transistor Tr4 is coupled by way of a resistor R11 and a diode D1 to terminal F of a change-over switch SW2 on one hand, and by way of a condenser C2 to a ground potential on the other. The other arrangements of the circuit remain unchanged as compared with the circuit of FIG. 1. Meanwhile, the other terminal G of switch SW2 connects terminal B, which is coupled to a constant-voltage-potential-source, with both light receiving element 1 and resistor R4.

In the initial phase of an operation, change-over switch SW2 is connected to terminal F, while a voltage at terminal B is supplied to condenser C2 by way of diode D1 and resistor R11 so as to charge the condenser. As a result, the voltage stored in condenser C2 brings transistor Tr4 into a conducting condition, while a voltage at terminal C is impressed by way of a resistor R12 and the collector-emitter of the transistor on pre-illumination lamp l, thereby lighting pre-illumination lamp l. Pre-illumination lamp l is arranged so that the emitted light is received by light receiving element 1. The amount of light emitted by pre-illumination lamp l is sufficient to maintain the sensitivity-characteristic of light receiving element 1 in a stable condition.

When a lighting signal for illumination lamp L is issued from a suitable means, then lighting switch SW1 is closed, whereupon change-over switch SW2 changes its connection from terminal F to terminal G. The operation of the circuit except for that portion encompassed by a broken line 10 is the same as previously described with respect to the prior art controlled lighting device. An operation of the portion of the circuit in box 10, however, is presented below.

Figure 5:
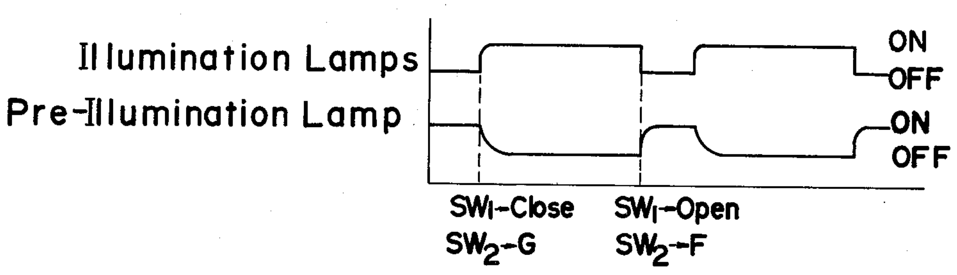
FIG. 5 is a diagram showing the relative time periods for lighting an illumination lamp and a pre-illumination lamp in the circuit of FIG. 4.

When change-over switch SW2 changes its connection from terminal F to terminal G, the voltage stored in condenser C2 is discharged. During the discharge period, transistor Tr4 remains on a pre-illumination lamp l continues to be lit. If the discharge period of condenser C2 is so set as to be longer than the duration of the build up stage of lighting of illumination lamp L, as shown in FIG. 5, then light continues to be incident on light receiving element 1 even during the build up stage of lighting of lamp L. Since the input voltage is controlled in correspondence with the light emitted by both lamps L and l, it is thereby possible to prevent an overvoltage input to illumination lamp L as well as a defective sensitivity characteristic of light receiving element 1. The light from pre-illumination lamp l continues at least until the desired light responsiveness of light receiving element 1 rises to a stable level from its zero condition, i.e., the level for darkness.

Figure 6:
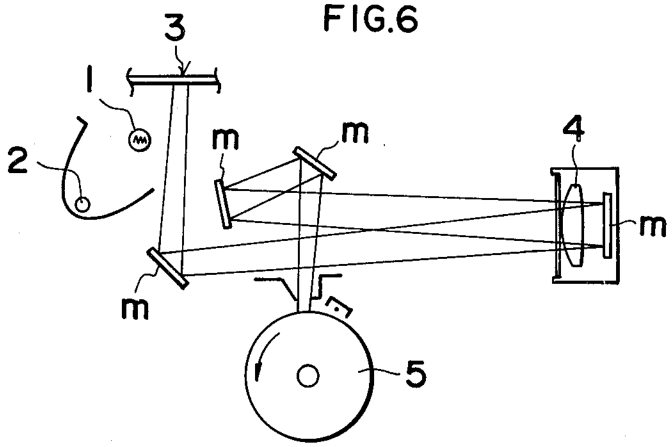
FIG. 6 is a schematic diagram of a copying machine in which an exposure lamp serves as an illumination lamp.

FIG. 6 shows a portion of an electrophotographic copying machine having an exposure lamp 2 which constitutes the illumination lamp. The positional relationships between exposure lamp 2 and light receiving element 1 and the arrangement of the pre-illumination lamp l are shown in FIGS. 7(*a*) and 7(*b*), respectively.

The exposure lamp of the electrophotographic copying machine is intended to illuminate an original placed on an original-illuminating portion 3. The lamp 2 is controlled in the manner previously described so that the amount of light emitted does not vary due to a variation in voltage at a potential source. The light from an illuminated original is projected on a photo-sensitive drum 5 by way of an optical system including reflecting mirrors m and lens 4. The ON-OFF operation of exposure lamp 2 is effected in response to a copying operation such as transportation of an original, rotation of photo-sensitive drum 5, etc. The ON-OFF operation of the exposure lamp is effected once for each copying operation. As a result, if a defect arises such as an overvoltage input in the exposure lamp, then there results an adverse effect on the service life of the lamp 2.

To avoid this possibility, a pre-illumination lamp as previously described is provided. Lamp l is arranged within a casing 6 housing light receiving element 1, which is adapted to receive the light from exposure lamp 2.

Figure 7A:
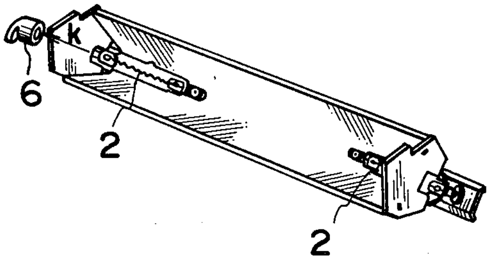
FIG. 7(*a*) is a perspective view showing the positional relationship between an exposure lamp and a light receiving lamp.
Figure 7B:
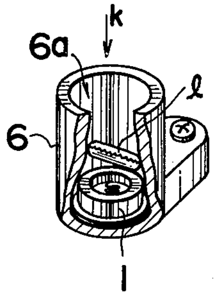

Casing 6, as shown in FIG. 7(*b*), receives light from the exposure lamp which is incident in the direction of an arrow k on light receiving element 1. Casing 6 serves to shield external light for the light receiving element. Pre-illumination lamp l is provided in such a position as not to hinder incident light from the light exposure receiving element. The light receiving element and pre-illumination lamp are connected in accordance with the circuit arrangement shown in FIG. 4. Thus, shortcomings such as an overvoltage input experienced during the build up stage of lighting of the exposure lamp can be prevented.

The operation of pre-illumination lamp will be described in association with a copying operation of a copying machine. When a potential-source switch (not shown) for a copying machine is turned on, then a drive motor (not shown) will be operated, whereupon appropriate voltages are supplied to the respective potential source terminals A, B, C, D and E in the light controlling circuit shown in FIG. 4. At this time, lighting switch SW1 remains in its open position and change-over switch SW2 is switched to the side of terminal F. Under this condition, pre-illumination lamp l alone is lit and light emitted by the pre-illumination lamp is incident on the light receiving element.

When a copying-operation-starting signal is issued, then the following operations take place: scanning of an original (not shown), then rotation of the photo-sensitive drum, transportation of a copying sheet (not shown) and the like. During these operations lighting switch SW1 is closed and the change-over switch SW2 is switched to side of terminal G, so that exposure lamp 2 is lit under a phase control. The duration of the build up stage of lighting of a halogen lamp serving as exposure lamp 2 is on the order of 100 msec. On the other hand, the duration of the build up stage of the CdS cell used as light receiving element 1 for restoring its sufficient sensitivity from that of darkness is immaterial. The discharge time for condenser C2 is set so as to be longer than 100 msec. Accordingly, during the build up stage of lighting of the exposure lamp, the light from the pre-illumination lamp is incident on the light receiving element, thereby preventing an overvoltage input to the exposure lamp. As the copying operation proceeds, lighting switch SW1 is opened in response to a suitable signal and change-over switch SW2 is switched back to terminal F, so that exposure lamp 2 is turned off, while pre-illumination lamp l is lit.

The ON-OFF operation of exposure lamp 2 during a copying operation has been described thus far. As is apparent from this, the ON-OFF operation of the exposure lamp is effected for each copying operation, so that the frequency of the ON-OFF operation is more than that of an ordinary illumination lamp. As a result, if an overvoltage input is provided, then the service life of the lamp will be significantly shortened. Furthermore, the overvoltage can result in an over-exposure during the build up stage of exposure, which presents many disadvantages for the copying machine. In comparison, adoption of a pre-illumination lamp according to the present invention eliminates such disadvantages.

Meanwhile, the amount of light emitted from the pre-illumination lamp shown in the embodiment suffices, if it improves the responsiveness of the light receiving element by illuminating the light receiving element enough to present an electric resistance commensurate with the amount of light from the illumination lamp. Thus the amount of light emitted by the pre-illumination lamp may be set at a desired level. In order to prevent an overvoltage input to the illumination lamp L, however, the amount of the light from the lamp should preferably be greater than the amount of light emitted by the illumination lamp which is received by light receiving element 1.

Pre-illumination lamp l may be kept lit, if the amount of light is to be maintained at a constant level, in contrast to the embodiment shown above. In this case, however, if the amount of light emitted by pre-illumination lamp l is excessive, then the accuracy of light receiving element 1, which detects an amount of light from illumination lamp L, will be impaired.

While pre-illumination lamp 1 is used as a pre-illumination system in the above-described embodiment, illumination lamp L itself may be lit at a time earlier than is actually required. The light thus emitted by lamp L is then incident on light receiving element 1.

Figure 8:
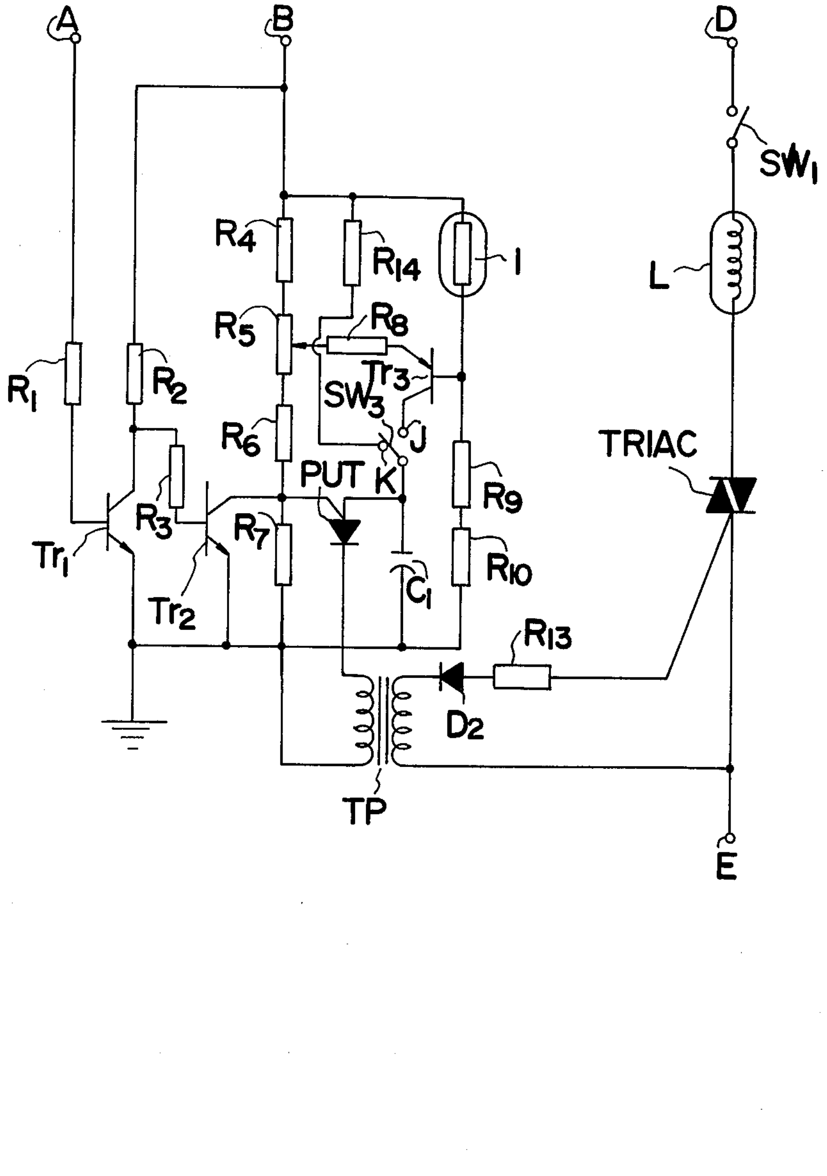
FIG. 8 is a circuit diagram of a modified embodiment of a controlled lighting device in accordance with the present invention.

In this case, initial lighting of illumination lamp L may be effected by closing light switch SW1 and connecting change-over switch SW3 to terminal K. The connection to terminal K causes power source terminal B and resistor R14 to be coupled with condenser C1, as shown in FIG. 8. The initial lighting may then be effected without the controlled lighting circuit including light receiving element 1. Power may then be supplied to the illumination lamp by way of the controlled lighting circuit by switching change-over switch SW3 to terminal J in the actual utilization.

In this manner, light receiving element 1 at the time of normal actuation, i.e., when conducting the phase control of illumination lamp L, would already have stable sensitivity characteristics so as to effect the normal control even without providing pre-illumination lamp l. The input of overvoltage to the illumination lamp is also prevented since lamp L is initially phase controlled with only the resistivity of fixed resistor R14.

It is noted that the above description and the accompanying drawings are provided merely to present exemplary embodiments of the present invention and that additional modifications of such embodiments are possible within the scope of this invention without deviating from the spirit thereof.

We claim:

1. A controlled lighting device including an illumination lamp, means for supplying an input voltage to the illumination lamp, a light receiving element for detecting an amount of light from the illumination lamp and a control circuit for controlling the input voltage for activating the illumination lamp commensurate with a variation in the amount of light emitted by the illumination lamp and detected by the light receiving element, the controlled lighting device comprising:

a pre-illumination means for illuminating the light receiving element;

a further control circuit for supplying an input voltage for activating said pre-illumination means at least during the time required for the illumination lamp once activated to reach a predetermined level of illuminescence, said further control circuit including: means for supplying an input voltage to said further control circuit; switching means for disconnecting the input voltage from said further control circuit when the input voltage for the illumination lamp is to be supplied; a condenser for storing an electrical charge until said switching means disconnects the input voltage from said further control circuit; means for discharging said condenser so as to supply another input voltage for said further control circuit at least during the time required for the illumination lamp to reach the desired level of illuminescence;

during the period of operation of said pre-illumination means, said pre-illumination means preventing the input of an excessive voltage from being supplied to the illumination lamp during the time required for the illumination lamp to reach the predetermined level of illuminescence.

2. A controlled lighting device for an electrostatic copying apparatus having an exposure lamp, a light receiving element for detecting an amount of light emitted from the exposure lamp, means for supplying an input voltage to the exposure lamp, a control circuit controlling said input voltage for the exposure lamp commensurate with a variation in the amount of light emitted from the exposure lamp and detected by the light receiving element, and switching means for connecting the supply means with the exposure lamp in relation to the copying operation of the electrostatic copying apparatus, comprising:

a pre-illumination means for illuminating the light receiving element;

a further control circuit for supplying a reference voltage for activating said pre-illumination means at least during intervals with said supply means disconnected from said exposure lamp and at least during the time required for the exposure lamp once activated to reach a predetermined constant level of illuminescence relative to said input voltage; and during the period of operation of said pre-illumination means, said pre-illumination means preventing the input of an excessive voltage from being supplied to the exposure lamp during the time required for the exposure lamp to reach the predetermined level of illuminescence.

3. A controlled lighting device for an electrostatic copying apparatus comprising an exposure lamp, means for supplying an input voltage to the exposure lamp, a light receiving element for detecting an amount of light from the exposure lamp and a control circuit for controlling said input voltage commensurate with a variation in the amount of light emitted by the exposure lamp and detected by the light receiving element, the controlled lighting device comprising: a pre-illumination lamp provided in addition to the exposure lamp; a further control circuit for connecting a reference input voltage for activating said pre-illumination lamp at least during the time required for the illumination lamp once activated to reach a predetermined constant level of illuminescence relative to said reference input voltage, said further control circuit further including:

a switching means for connecting said reference input voltage with said pre-illumination lamp at least during intervals with said supply means disconnected from said exposure lamp, and said switching means disconnecting said reference input voltage from said pre-illumination lamp when the exposure lamp is supplied with the input voltage.

4. A controlled lighting device as in claim 3 wherein said further control circuit further includes a delay circuit for supplying said reference input voltage to said pre-illumination lamp at least during the time required for the illumination lamp once activated to reach the predetermined level of illuminescence after said control circuit has disconnected said pre-illumination lamp from said reference input voltage.

* * * * *

UNITED STATES PATENT OFFICE
CERTIFICATE OF CORRECTION

PATENT NO. : 4,227,119
DATED : Oct. 7, 1980
INVENTOR(S) : Murata et al

It is certified that error appears in the above-identified patent and that said Letters Patent are hereby corrected as shown below:

On the title page the following should be added:

-- [30] Foreign Application Priority Data

Nov. 12, 1975 Japan ......... U.M. 50-154393

Sept.24, 1976 Japan ......... U.M. 51-128730 --.

Signed and Sealed this

*Twelfth* Day of *May 1981*

[SEAL]

*Attest:*

RENE D. TEGTMEYER

*Attesting Officer* *Acting Commissioner of Patents and Tradema*